(12) United States Patent
Rao et al.

(10) Patent No.: US 8,135,191 B2
(45) Date of Patent: Mar. 13, 2012

(54) METHOD AND DEVICE FOR AUTOMATICALLY DETECTING COLLIMATION EDGES

(75) Inventors: Yuming Rao, Shenzhen (CN); Wenwu Sun, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 576 days.

(21) Appl. No.: 12/345,475

(22) Filed: Dec. 29, 2008

(65) Prior Publication Data

US 2009/0238433 A1   Sep. 24, 2009

(30) Foreign Application Priority Data

Mar. 21, 2008   (CN) .......................... 2008 1 0066147

(51) Int. Cl.
*G06K 9/00*   (2006.01)

(52) U.S. Cl. ........ 382/128; 378/147; 382/132; 382/169; 382/199; 382/237; 382/281

(58) Field of Classification Search .................. 378/147; 382/128, 132, 169, 199, 237, 281
See application file for complete search history.

(56) References Cited

U.S. PATENT DOCUMENTS

| | | | | |
|---|---|---|---|---|
| 4,967,079 A | * | 10/1990 | Shimura | 250/586 |
| 5,901,240 A | * | 5/1999 | Luo et al. | 382/132 |
| 6,212,291 B1 | * | 4/2001 | Wang et al. | 382/132 |
| 6,317,510 B1 | * | 11/2001 | Murakami | 382/132 |
| 6,356,651 B2 | * | 3/2002 | Murakami | 382/128 |
| 7,382,908 B2 | * | 6/2008 | Dewaele et al. | 382/132 |
| 7,508,970 B2 | * | 3/2009 | Jabri et al. | 382/132 |
| 2003/0091222 A1 | * | 5/2003 | Young et al. | 382/132 |
| 2005/0018893 A1 | * | 1/2005 | Wang et al. | 382/132 |
| 2007/0081713 A1 | * | 4/2007 | Jerebko | 382/128 |
| 2009/0129660 A1 | * | 5/2009 | Gregson | 382/133 |

FOREIGN PATENT DOCUMENTS

| | | |
|---|---|---|
| CN | 1449543 A | 10/2003 |
| CN | 1685373 A | 10/2005 |
| DE | 10309166 A1 | 9/2004 |
| JP | 2007190358 A | 2/2007 |
| WO | 2004105609 A1 | 12/2004 |

* cited by examiner

*Primary Examiner* — Arnold Kinkead
*Assistant Examiner* — Richard Tan
(74) *Attorney, Agent, or Firm* — Kory D. Christensen; Stoel Rives LLP (57) ABSTRACT

A method for automatically detecting a collimation edge or region includes reading an image captured by an X-ray imaging system, detecting intersection points between a foreground and a background and between a foreground and a tissue on the X-ray image, and performing a Hough transform or Radon transform on the detected intersection points to form collimation edge lines interconnecting the foreground and the background, and the foreground and the tissue, respectively.

26 Claims, 7 Drawing Sheets

Fig.11

METHOD AND DEVICE FOR AUTOMATICALLY DETECTING COLLIMATION EDGES

CROSS-REFERENCE TO RELATED APPLICATIONS

The present application claims priority to Chinese Patent Application No. 200810066147.5, filed Mar. 21, 2008, for "Method and Apparatus for Automatically Detecting Collimation Edges," which is incorporated herein by reference.

TECHNICAL FIELD

The present disclosure relates to X-ray image processing.

SUMMARY

A method and device are disclosed for automatically detecting a collimation edge or region.

DETAILED DESCRIPTION

In an X-ray image, the collimated region is often referred to as the foreground. A foreground image makes no contribution to the X-ray imaging, so during enhancement processing of the X-ray image, the pixels in this region are usually removed in order to not negatively affect image enhancement processing. Collimated image "cropping" may therefore achieve higher image quality.

Collimated image cropping may be classified into automatic image cropping and manual image cropping. The manual cropping suffers from some serious drawbacks. For example, manual cropping increases the workload of a clinical technician, which reduces the efficiency of clinical radiography. In addition, manual cropping has to be performed on a processed image. This means that both the useless foreground image information and the useful information are considered during the analysis and processing, which unfavorably affects the image analysis and processing. As a further consequence, it compromises the image quality, and slows down the whole process due to an increased amount of data to be processed.

In general, the existing techniques for collimated image cropping have the following disadvantages. First, owing to X-ray scattering, the transition between the ROI region (the ROI region herein refers to the remainder of the image with the foreground removed) and the foreground becomes complicated. Second, the edges between the tissues and the foreground are unable to be clearly identified, and the contrast is rather poor because of the high density of the tissues or the underexposure caused by reduced X-ray dosage. Third, the collimated region in the image becomes extremely irregular because multiple regions (including the collimated region) are penetrated by X-rays, which may be caused by an underestimated large dosage exposure. Finally, various special postures to be captured may cause the collimation edges to appear in the image as an irregular polygon. For the above-indicated reasons, existing collimation edge detecting techniques are in most cases ineffective, thereby making the automatic identification of the collimation region extremely difficult.

Current X-ray imaging systems, as well as earlier X-ray imaging systems, locate the collimation edges based on the position information of the collimator fed back by a positioner (i.e., a device for controlling motion of an X-ray tube or collimator). Such a positioner is generally coupled to an X-ray imaging apparatus. When an X-ray image is clinically taken, it is always required, in the case of a particular posture to be captured, that a detector or a tube be rotating. However, under such a circumstance, the information returned by the positioner either cannot be used directly, or becomes totally useless. In addition, a movable bed-side machine (e.g., a portable X-ray imaging system) is not equipped with such a positioner or the like. Another reason the positioner is not reliable may be that the tube does not perfectly match with the center of the detector for some reason, the result of which is that the position information regarding the collimator obtained by the positioner cannot be correctly used for locating the collimation edges on the image. In some situations, such as the scattering of X-rays, the feedback of the positioner is not precise. The situation with earlier X-ray imaging systems is even worse. Since there is generally no communication interface between the positioner and the console, related data cannot be transported. Hence, the clinical technician is required to manually locate the collimator, or crop the image in accordance with the circumstances.

According to one existing method of detecting a collimation edge, the following steps are executed. The intersection between the foreground and background is first determined based on such parameters as amplitude, span, background deviation and maximum slope, as well as the least mean square error equation. Based on similar parameters, the intersection between the foreground and the tissues is determined by weakening these conditions and increasing pixel gray value control. Those points that satisfy part of these characteristics are grouped into different categories, each of which is assigned to a level. The intersection points between the foreground and the background have the highest level, the points at the intersection between the foreground and the tissues have the second highest level, and the other intersection points have the lowest level. Thereafter, a Hough transform is performed on these intersection points. The intersection points of different levels are weighted differently in Hough space (the intersection points of a higher level are assigned with a higher Hough weight). The resultant straight lines, which satisfy Hough transform threshold values, are determined as candidate straight lines.

In the case of a single exposure, the following criteria should be met: the collimation edges are outside the background region; the dynamic ranges of the pixels gray regarding the opposing collimation edges are not be similar; the number of discontinuity points in the collimation edges is not large; the collimation edges have a constant polarity, and the collimation edges are generally aligned. Based on the above criteria, those unsuitable candidate collimation edge lines may be excluded. So far, the remaining candidate straight lines have survived from a test of line levels. Subsequently, a combination of optimum candidate straight lines is selected to determine the edges based on the geometrical and regional attributes (including parallelism, orthogonality, convexity, shape, centrality, occupation, boundary, perimeter, contract, etc.) between pairs of lines. Afterwards, it is also required to further control the validity for the resultant candidate straight lines representing the collimation edges, guided by the following principles: the radiation region (included in the collimation edges) should not exclude the large background region; the radiation region should contain a region other than the background (90% of the radiation region is the background); and the radiation region should contain a large, useful information (anatomic information) region.

Another existing method of detecting the collimation edges is realized as follows. The original image is first treated using a Sobel edge detection operator to derive edge gradient images in four edge regions (up, down, left and right). One gradient image is generated for each edge region. Thereafter, the original image and corresponding gradient images are shrunk (optionally ¼, ⅛, 1/16, etc. of the original image) and mapped onto a Radon transform space for the subsequent peak detection. The peak detection in the Radon transform space is fulfilled by searching intervals using a limited angle variation. For example, it is understood that the upper and lower collimation edges cannot have any bevel angle between 0 and 45 or between 136 and 179. If local maximum peaks that satisfy the threshold value are obtained, these peak values have respective validity tested based on the gradient characteristics. Finally, from all of the valid peaks, a peak is selected as the corresponding peak of the assumed collimation edges based on the "low region and high effect" principle. In this way, the peaks in each of the four regions (corresponding to the four edges of the assumed quadrilateral collimation) are obtained. Finally, the collimation edges may be located based on corresponding straight line equations. Whether the resultant edges are valid or not may be tested against the principle that the maximum pixel value in the determined collimated region should be smaller than that in the other non-collimated regions, to be more specific, it should be smaller than a threshold value).

The problems with the existing techniques are as follows. First, the techniques are too complicated, which reduces efficiency. Second, the accuracy of the techniques is inadequate. For example, the intersection edges between the skeleton and the soft tissues may be mistaken for the collimation edges. Third, more precise threshold information regarding background pixels is needed to check whether each of the detected straight lines is valid and whether the entire detected collimation edges are valid. Finally, the existing techniques are not reliable, especially in the case of underexposed images with a poor contrast or overexposed images. Thus, false positives may be reported.

According to one aspect of the disclosure, a method of automatically detecting a collimation edge includes reading an image captured by an X-ray imaging system; detecting intersection points between a foreground and a background and between a foreground and a tissue on the X-ray image; and performing a Hough transform or Radon transform on the detected intersection points to form collimation edge lines interconnecting the foreground and the background, and the foreground and the tissue, respectively.

In one embodiment, the detection step further includes detecting the intersection points row by row from left to right and then vice versa for the image, and detecting the intersection points column by column from top to bottom and then vice versa for the image.

The detection step may further include filtering pixels of each row and each column in the image so as to generate a row-filtered image and a column-filtered image; and detecting the row-filtered image row by row, while the column-filtered image column by column.

In one embodiment, the detection step further includes determining an intersecting area according to the principle that the gray value begins increasing at the starting pixel and the gray value remains unchanged at the end pixel, based on the difference between the value of the end pixel and the value of the starting pixel, and the distance between the end pixel and the starting pixel; and selecting, as the intersection point, the point at which the gray value changes the most rapidly, or the middle point, the starting point, or the end point of the intersecting area, or the middle point of a predetermined length of pixels where the gray value varies the most rapidly.

For each row or each column, only one intersecting point may be selected out of the intersection points between the foreground and the background, and out of the intersection points between the foreground and the tissue can be determined, the detection of the intersecting point between the foreground and the background being independent from the detection of the intersecting point between the foreground and the tissue.

In one particular embodiment, the image is divided into a upper region, a lower region, a left region and a right region for detection and transform processing; wherein variation in an angle $\theta$ involved in the transform step is limited to $\theta \in [-20,20]$ along a vertical edge, while limited to $\theta \in \{[70,90] \cup [-90,-70]\}$ along a horizontal edge.

In one configuration, when the transform is performed, the number of local peaks that satisfy the threshold conditions is limited.

The method of automatically detecting the collimation edges may further include performing a histogram analysis and/or a cumulative histogram analysis upon the X-ray image, so as to obtain valid maximum and minimum gray values of pixels on the image.

The method may also include properly shrinking and/or cropping the read image for the subsequent processes.

In one implementation, the method further includes a first decision making step, including the steps of: calculating a mean gray value and/or variance in the gray value of an entire row or entire column of pixels in an edge region of the image before detecting the image; and, if the mean gray value and the variance are smaller than respective predetermined threshold values, initially determining that a collimated region is present on the edge region of the image to be detected.

The method may also include a second decision making step, including the steps of: considering each of the determined straight lines representing the collimation edges as valid so as to determine intersecting area between regions and the foreground region; calculating a ratio of the number of intersection points falling in the intersecting area to the number of intersection points falling in the foreground region, and determining the collimation edge lines as valid, if the ratio is greater than a predetermined threshold value. The predetermined threshold value increases as the distance from the collimation edge line to the image center decreases. Moreover, the predetermined threshold value may be segmented values within a predetermined range or may be a linear decreasing function of the distance; wherein the predetermined threshold value ranges from 0.5 to 1.5.

The method may further include a third decision making step of determining, among the collimation edge lines as obtained, or sets of collimation edge lines that have been proved valid in the previous step, those edge lines that most satisfy an axial symmetry condition as the collimation edges.

In one embodiment, the method also includes an automatic correction step, including the steps of: determining an offset from a collimation edge to the image center based on position data on the opposing edge of said collimation edge; if the offset deviates from a known possible offset, calculating gray value variance of a row or column of pixels in the collimated region at a position behind that collimation edge line; and if the variance is greater than a predetermined threshold value, determining the collimation edge line concerned as a wrong straight line and excluding the wrong straight line; or picking up a missing collimation edge line based on the axial symmetry condition and the offset between the collimator center and the detector center.

The offset may be determined as follows. Collimation edges are first determined from an X-ray image captured when there is nothing existing between the collimator and the detector; the distance from the collimation edges to the image center is calculated as the offset amount; or the distance from opposing edges among the determined collimation edges that form the best rectangle to the image center is determined as the offset amount.

In one embodiment, the method includes an output step, including setting the collimated region of the image to 1 or 0, while setting the non-collimated region to 0 or 1; and outputting a binary image.

According to a another aspect of the present disclosure, an apparatus for automatically detecting collimation edges includes a read module for reading an image captured by an X-ray imaging system; a detection module for detecting intersection points between a foreground and a background and between a foreground and a tissue on the X-ray image; and a transform module performing a Hough transform or Radon transform on the detected intersection points to form collimation edge lines interconnecting the foreground and the background, and the foreground and the tissue, respectively. The detection module may first filter pixels of each row and each column in the image so as to generate a row-filtered image and a column-filtered image. The intersection points may then be detected row by row from left to right and then vice versa for the image, or detected column by column from top to bottom and then vice versa for the image.

In one embodiment, the apparatus further includes an analysis module for performing a histogram analysis and/or a cumulative histogram analysis upon the X-ray image, so as to obtain valid maximum and minimum gray values of pixels on the image.

The apparatus may also include a preprocessing module for properly shrinking and/or cropping the read image for the subsequent processes.

In one configuration, the apparatus includes a first decision making module for calculating a mean gray value and/or variance in the gray value of an entire row or entire column of pixels in an edge region of the image before detecting the image; and, if the mean gray value and the variance is smaller than a respective predetermined threshold value, initially determining that a collimated region is present on the edge region of the image to be detected.

The apparatus may also include a second decision making module for considering each of the determined collimation edge lines as valid so as to determine intersecting area between regions and the foreground region; calculating a ratio of the number of intersection points falling in the intersecting area to the number of intersection points falling in the foreground region, and determining the collimation edge lines as valid, if the ratio is greater than a predetermined threshold value.

In one embodiment, the apparatus includes a third judgment module for determining a collimation edge line, among the collimation edge lines as obtained, or among sets of collimation edge lines that have been proved valid in the previous step, which most satisfies an axial symmetry condition as the collimation edge.

The apparatus may also include a correction module for correcting any failed detection according to the following steps: determining an offset from a collimation edge to the image center based on position data on the opposing edge of said collimation edge; if the offset deviates from a known possible offset, calculating a gray value variance of a row or column of pixels in the determined collimated region at the position behind the collimation edge line concerned; and, if the variance is greater than a predetermined threshold value, determining the collimation edge line concerned as a wrong straight line and excluding the wrong straight line; or picking up a missing collimation edge line based on the axial symmetry condition and the offset between the collimator center and the detector center.

In one embodiment, the apparatus for automatically detecting the collimation edges according to the second aspect of the embodiments of the present disclosure further includes an output module for outputting a binary image wherein the collimated region is set to 1 or 0, while setting non-collimated region is set to 0 or 1.

Various embodiments of the method and apparatus for automatically detecting collimation edges according to the present disclosure may enable swift determination of intersection points between various regions based on respective contrasts. The method and apparatus may also perform Hough transform or Radon transform upon some of intersection points by applying limitations such as limitations in direction, angle, and the number of local peak values to be obtained in each edge region, thus obtaining various straight edges. The method and apparatus may further test the validity of the resultant straight lines based on parameters such as position, gray value and change in the gray value to screen the resultant straight lines representing the collimation edges. The method and apparatus may additionally select optimal sets of straight lines based on the principle that opposing edges are symmetric (or approximately symmetric). Finally, the method and apparatus may perform an automatic correction upon the determined collimation edges, so as to enhance the validity of the edges, eliminate false positives, and include missing edges. The disclosed method and apparatus are efficient and accurate, and can overcome the serious existing problems, such as missing detection and false positive reports.

The embodiments of the disclosure will be best understood by reference to the drawings in which like numerals refer to like parts or steps throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail in order to avoid obscuring other aspects of the disclosure.

A skilled artisan will recognize that the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Certain aspects of the embodiments described herein may be implemented as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Figure 1:
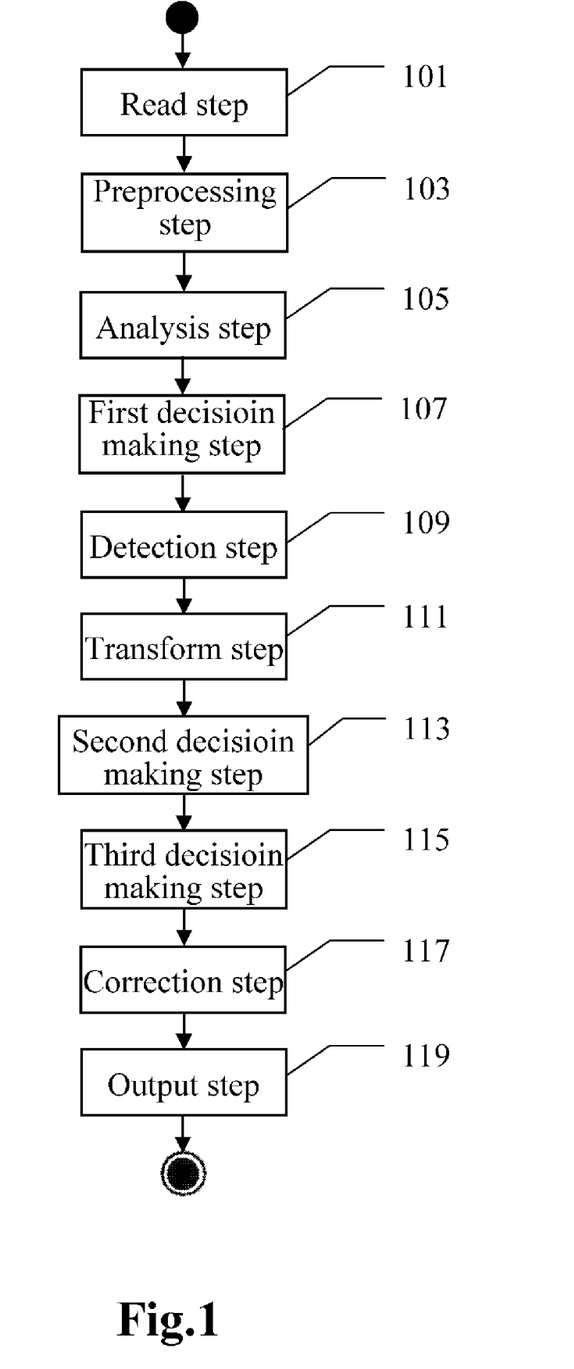
FIG. 1 is a flow diagram of a method of automatically detecting collimation edges.

Referring now to FIG. 1, a method of automatically detecting collimation edges or a collimated region according to this embodiment may include a read step 101, a detection step 109, a transform step 111 and other optional steps. A raw image captured by an X-ray imaging system is read at step 101. The raw image may have been subjected to some simple correction (e.g., having bad points, bad lines and invalid pixels removed) without being subjected to any image enhancing process (however, the method provided in the present disclosure is also applicable to enhanced images). The image does not have to be raw in one embodiment. It may have been be preprocessed (step 103), i.e., properly shrunk and/or cropped. The purpose of shrinking the image is to speed up the operation, and the image is cropped to avoid unnecessary detection.

In step 105, a histogram analysis and/or cumulative histogram analysis are performed on the image input in step 101. The analysis may be simply to obtain a valid maximum pixel gray value (PixelMaxValue, abbreviated as P_Max) and a valid minimum pixel gray value (PixelMinValue, abbreviated as P_Min) for the input image. These values may be the extreme gray values directly read from the image, or may be the extreme values determined from the cumulative histogram based on a corresponding percentage (for example, a value embracing 99% of gray scales is the maximum value, and, accordingly, the value that corresponds to 1% of gray values is the minimum value, the percentage of the gray value may be different in different cases). The extreme values will be used for the subsequent steps.

In the first decision making step 107, a rough decision is performed on the image to determine whether or not there is a collimated region in the image. It's assumed that the collimation edges are located in four sides of the image (i.e., up, down, left and right). In one embodiment, this step is performed based on the following criteria:

1) The variation in the pixel gray values in the collimated region is relatively small, at least true for pixels in the same row or column.
2) The pixels in the collimated region have relatively small gray values, because they are located in a non-exposed region. In an ideal situation, the gray value should be zero. However, a zero gray scale is always impossible because of the presence of X-ray penetration and scattering, so the actual value is close to zero. This is a valid principle even when the gray values are subjected to reverse processing, because, in that case, the ideal minimum value will become the maximum.
3) Since the collimator is compact without any gap or hole therein, the collimated region in the image should not include an directly exposed area or strip.
4) The collimated region always begins from the edges of the image.

Figure 2:
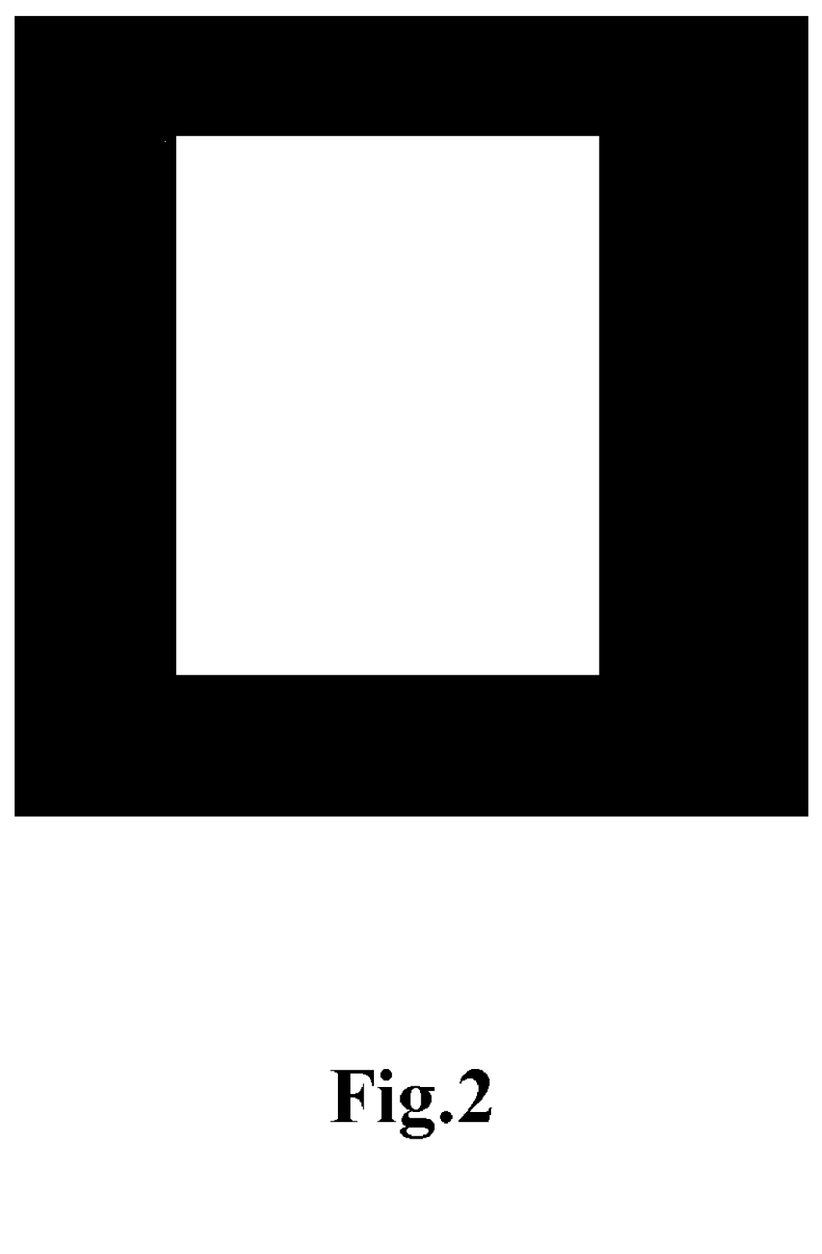
FIG. 2 is a schematic diagram of a collimated region.
Figure 3:
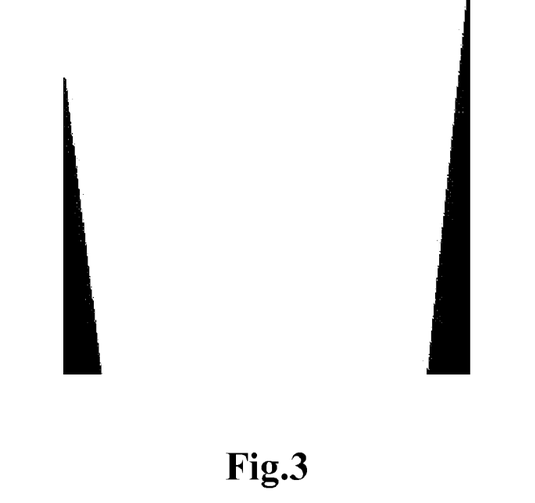
FIG. 3 is a schematic diagram of another collimated region.
Figure 4:
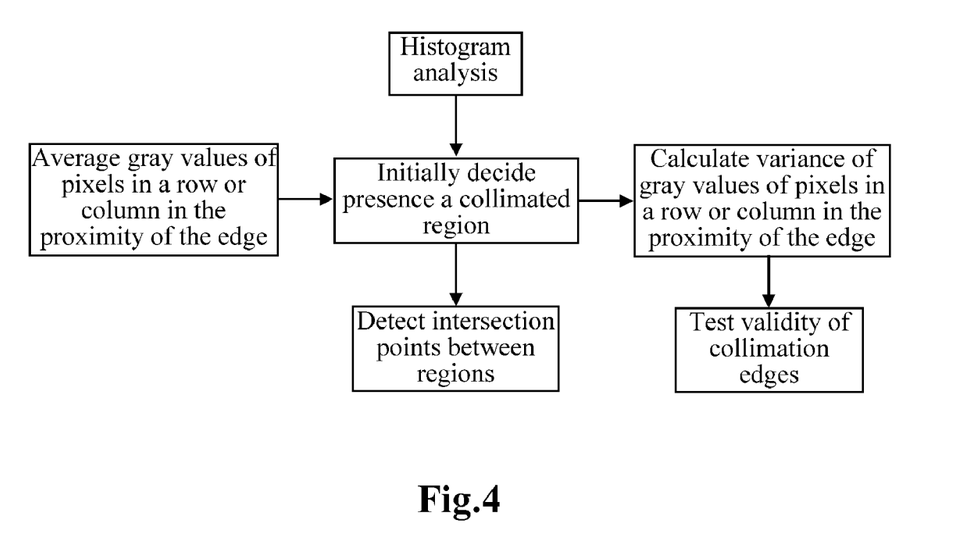
FIG. 4 is a flow diagram of a method of detecting a collimated region.

Based on the above four principles, a position in close proximity to the edge of the image (e.g., 10 or 20 pixels away from the edge) is selected, and all pixels in the same row or column as the selected position (the row corresponding to the up and down edges, and the column corresponding to the left and right edges) are calculated with respect to a mean gray value and/or variance in the gray values. The mean gray value and the variance are compared to respective predetermined thresholds. If they are smaller than the predetermined threshold values, it is determined that the image to be detected includes a collimated region. The gray value threshold may be calculated as being proportional to the maximum gray value of the image resulting from the previous step 105, e.g., 0.8*P_Max. However, the variance may not be considered in this stage of process in the case where the row or column where the selected position is located may traverse both the foreground and the background, or especially in the case where the collimator plane and the detector plane are not parallel, but form an angle therebetween, such that the collimated region projected onto the detector plane often appears as an irregular quadrilateral instead of a rectangle. In such cases, the variance of the gray values tends be extremely large, as shown in FIG. 2 and FIG. 3. That is why the variance should be considered in the second decision making step 113, as shown in FIG. 4.

If the relative position information of the collimator (expanded window size) may be obtained from the automatic collimator through communication, it is possible to determine whether the collimator up window, the collimator down window, the collimator left window and the collimator right window are completely open. Thus, the distribution of the collimated region on the image may be roughly obtained, so the first decision making step 107 is no longer unnecessary.

In step 109, detection is made as to the intersection points between regions. In general, an image may be divided into the following regions: a foreground (the collimated region), a background (direct exposure region) and an anatomic tissue region. Because an X-ray image has a collimated region and a radiated region, a contrast always exists at the intersection between the foreground and the background, between the foreground and the tissue, and between the background and the tissue. Generally, the pixel gray value of the background region is the highest, followed by the tissue region, and finally the foreground. Due to a large difference in the density between the soft tissue and the skeleton, another sharp contrast will appear between the skeleton and the soft tissue on the image. This also contributes to the difficulty in collimation edge detection, because the intersection between the skeleton region and the soft tissue region may be mistaken for the one between the collimated region and the tissue region.

The following is how the detection step 109 may be executed according to one embodiment. In order to prevent the effect of noise and make the variation in gray values locally uniform, a slide mean value filtering is performed on the pixels row by row or column by column, so as to generate data on two images (i.e., a row-filtered image and a column-filtered image). For the row-filtered image, the intersection points are detected row by row from left to right and then vice versa, while for the column-filtered image, the intersection points are detected column by column from top to bottom and then vice versa.

Figure 5:
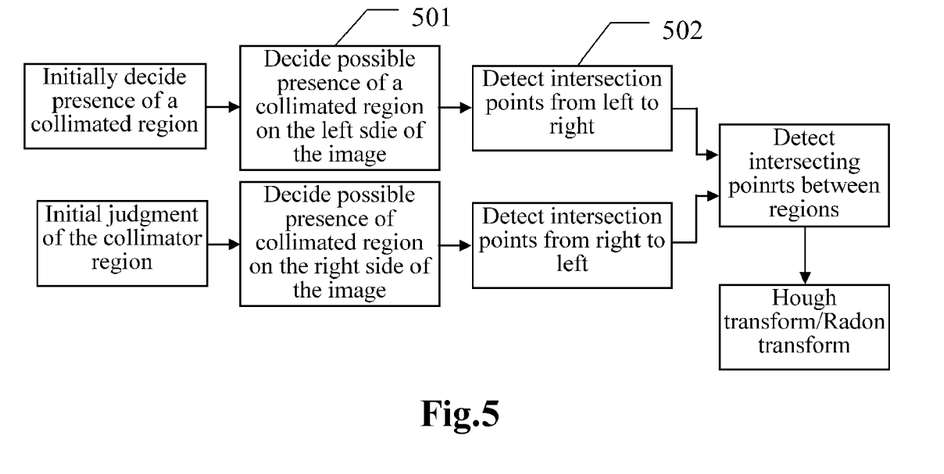
FIG. 5 is a flow diagram of a method of detecting intersection points between regions from left to right and vice.
Figure 6:
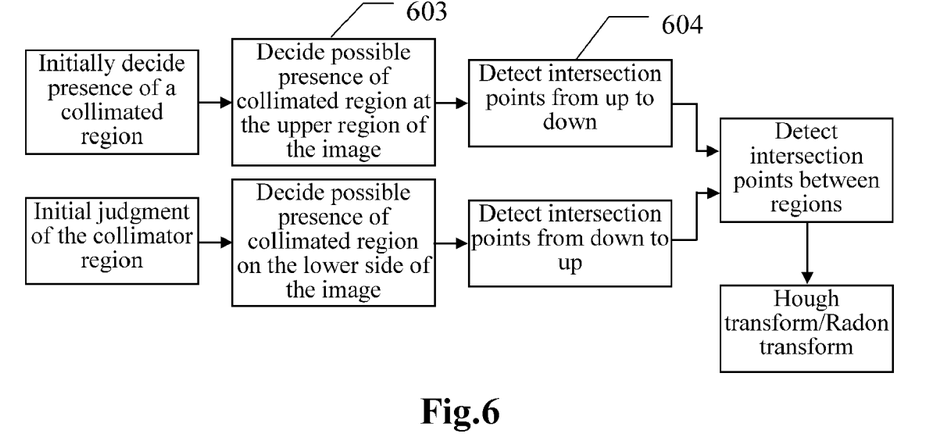
FIG. 6 is a flow diagram of a method of detecting intersection points between regions from top to bottom and vice.

The contrast between regions and the scattering property of the X-ray may be helpful in determining the exact intersection points, which is detailed in FIG. 5 and FIG. 6. Assume, for instance, that a collimated region is determined as being present on the left side of the image in step 107, indicated by block 501 in FIG. 5 (block 603 in FIG. 6 indicating presence of the collimated region at the upper region of the image). According to the criteria stated above in connection with step 107, if the foreground region (the collimated region) is connected to other regions, the gray value at the intersection will always increase from left to right, starting from the foreground region. If the other region happens to be the background, the increase must be particularly sharp as compared to the other region, as indicated by block 502 in FIG. 5 (block 604 in FIG. 6 denoting the situation at the top). Therefore, step 109 may be performed based on two parameters. The gray value increases at the beginning (starting point) and remains unchanged at the end (end point), with the increased quantity at least larger than 1 each time. The difference in the gray value between the end point and that of the starting point is expressed as PixelValueVariation, abbreviated as P_V_Var. The distance between the end pixel and the starting point pixel is expressed as P_Distance. The total variation in gray values at the intersection between the foreground and different regions is also different. Two threshold values P_V_Var_TH1 and P_V_Var_TH2 may be set, which correspond to the minimum total variation in the gray values at the intersection between the foreground and the background, and the intersection between the foreground and the tissue, respectively. For example, P_V_Var_TH1 may be set to 0.4*P_Max, and P_V_Var_TH2 may be set to 3*P_Min. The distance between the end pixel and the starting point pixel is mainly considered to eliminate the effects of any bad point, bad line, and noise. The distance should also be assigned with a threshold value P_Dist_TH, which is preferably set small, and generally to $10 \leqq P\_Dist\_TH \leqq 30$. The above two parameters determine the intersection between regions.

In one embodiment, when detecting the intersection points between the foreground and the background and the intersection points between the foreground and the tissue, only one point needs to be determined for each row or each column. The detection of the intersection points between the foreground and the background and the corresponding detection between the foreground and the tissue are independent from each other and do not interfere with each other. Selecting the most reasonable intersecting point at the intersection may be realized in a number of ways, e.g., by selecting the point at which the gray value changes most rapidly, or by selecting the middle point, the starting point, or the end point at the intersection, or by selecting the middle point of a certain length of pixels (e.g., 10 pixels) when the variation in gray values is most rapid in the certain length of pixels.

Upon experiment with large data, the last selection technique is found to be the most efficient. Regardless of which sides of the image the collimated region is located, detection only has to be carried out until the image center. In fact, since the relative dimension and position information of the collimation window (e.g., the window size, the angle between the collimator plane and the detector plane, Source to Image Distance, abbreviated as SID, the distance of the focus from the collimator) may be obtained, the distribution of the collimation edges on the detector may be known according to projection principles. If the collimator center and the detector center coincide, the so-determined distribution should be precise. Thereby, the distribution of the collimated region on the image may be directly obtained without the need for more complicated algorithms to support the automatic segmentation. However, typically, for mechanical reasons or limitations in hardware equipment resources, the projection method becomes less precise, and thus cannot be used directly. However, if the rough distribution of the collimated region on the image can be obtained, a valid detection area may be divided on each side of the image, thereby reducing the detection area and speeding up the detection of the intersection points. In fact, dividing the image into four areas for detection may be less time-consuming as compared to global search and detection.

Figure 7:
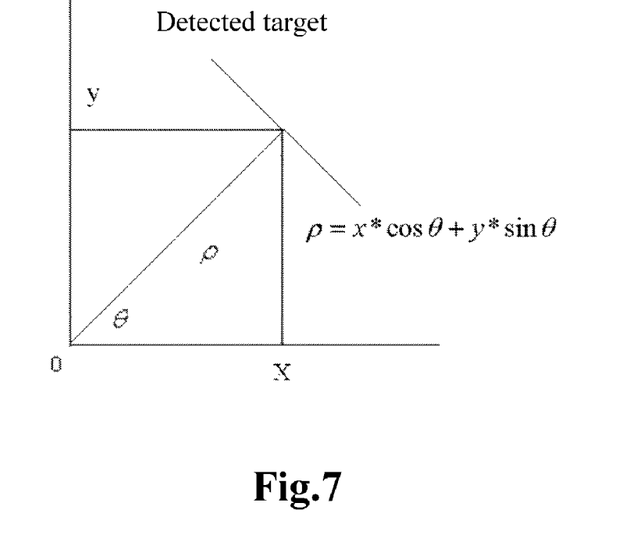
FIG. 7 is a schematic diagram of an HT/RT transform.

In step 111, a Hough transform or Radon transform (abbreviated as HT/RT) is performed on the collimation edge resultant from the previous step 109. Using HT/RT to determine straight lines has been widely used and proved to be reliable. In this embodiment, the transform is based on the equation $\rho = x^* \cos \theta + y^* \sin \theta$. Whereby, each point on the image plane is mapped to one curve on the plane defined by the parameter $\rho-\theta$, as shown in FIG. 7. The transform is described as follows: as in the step 109, the image to be detected is divided into upper, lower, left and right portions. The angle ($\theta$) is also limited to some extent in accordance with circumstances. For example, the angle ($\theta$) satisfies $\theta \in [-20,20]$ along horizontal edges, while $\theta \in \{[70,90] \cup [-90,-70]\}$ along vertical edges. The angle may be given different values to satisfy different requirements. Limited area and angle serve the purpose of reducing the area to be detected, which is helpful to speed up the detection. In principle, for each of the four sides, only one straight line needs to be determined as the candidate collimation edge. However, for various reasons, the single straight line as determined is always not the one that perfectly coincides with the straight edge. This makes it necessary to obtain a number of straight lines and then select the best one as the candidate collimation edge. Therefore, for each of the four edges, several straight lines are obtained, and then one of them is selected as the candidate collimation edge line for each edge.

Each of the four edge regions is subjected to HT/RT. Several local peaks (e.g., 2-4) that are larger than the threshold value are picked. Every time a local peak is selected, the adjacent values should be set zero, so as to avoid simply repeating the detection results. Each local peak corresponds to a unique $(\rho,\theta)$, which in turn determines only one straight line according to the equation $\rho=x*\cos\theta+y*\sin\theta$. Upon HT/RT in step 111, several candidate straight lines are determined for each of the four edge regions of the image. The number of candidate straight lines for each of the four edges may not be the same, which depends on the number of local peaks in that region that satisfy the threshold condition. If the image being detected can be determined to comprise a valid small collimated region (for example, the relative dimension and position information of the collimation window are known, as in step 109), only one straight line needs to be determined in this small area as the candidate collimation straight line.

In one embodiment, the candidate straight lines for the collimation edges resultant from the transform step 111 are subjected to a screening in the second judgment step 113. The lines that do not satisfy the desired condition will be excluded. Not all of the candidate straight lines obtained from the Hough transform are valid collimation edges. Only one candidate straight line for each edge best coincides with the actual collimation edge. The real collimation edges should meet the following criterion: they must locate at the intersection between the image regions (i.e., between the foreground and the background, or between the foreground and the tissue. Few intersection points should fall outside the intersecting area, because according to the theories as described with respect to step 109, many of the intersection points should fall on the straight line. Since the theories hereinabove described ensure that a great number of intersection points fall directly on the straight line, it is reasonable to come to the conclusion that the intersecting point determined for a region at a distance from the candidate collimation edge smaller than a value (threshold value) is considered as a true intersecting point for the region concerned, while those points in the collimated region behind the candidate straight line are considered as the intersection points that should be in the foreground region.

Hence, the larger the ratio of the number of the intersection points on the intersecting region to the number of the intersection points that fall in the foreground region, the clearer it indicates the candidate straight collimation edge falls in the intersection between the foreground and other regions, and then the more reasonable the candidate straight collimation edge. The ratio of the number of the intersection points that are in the intersection to the number of the intersection points in the foreground region is expressed as ValidTransitionRate. If the ratio is larger than a threshold value ValidTransitionRate_TH (abbreviated as VTR_TH), the related candidate straight edge is valid. This threshold value will increase as the distance of the candidate straight edge from the image center (LineAndCenter_Distance, abbreviated as LC_Dist) decreases. This is because the closer the candidate straight line is to the image center, the more probable a false positive may be reported. In such cases, a stricter limitation should be imposed accordingly.

The determination of VTR_TH may be as follows. The distances between the image edges and the image center may be divided into three ranges. When the distance of the candidate straight edge is the farthest, the middle or the nearest to the image center, ValidTransitionRate_TH have different values. For example, if the distance from the image edge to the image center is 1500, then LC_Dist<500, VTR_TH=1.5; 500<=LC_Dist<1000, VTR_TH=1.0; LC_Dist>=1000, VTR_TH=0.5. As described in step 107, the gray values and variance in the gray values with respect to pixels in the same row (corresponding to vertical edges) or the same column (corresponding to horizontal edges) as a selected position in close proximity of the image edges (e.g., 10 or 20 pixels away from the edge) are calculated. As has been discussed above, when computing the variance, attentions should be given to the following situations: in the case where the row or column where the selected position is located may traverse both the foreground and the background, and particularly in the case where the collimator plane and the detector plane are not parallel, but form an angle therebetween, the collimated region projected onto the detector plane often appears as an irregular quadrilateral instead of a rectangle, and the variance of the gray values as obtained in such cases may be large, as shown in FIG. 3.

Based on the position data on the candidate straight edge on the image, it may be determined whether or not the row or column in which the selected position locates traverses both the foreground and the background regions. Assuming that the row or column concerned locates in the foreground region to be affirmed by the candidate straight edge, if the calculated variance is larger than a threshold value (which may be a proportion of the maximum pixel value, e.g., 0.2*P_Max), the straight candidate collimation edge is invalid. As has been hereinabove discussed in connection with step 107, the gray values of the pixels distributed in the foreground region should be small. Accordingly, it is reliable to determine the regions based on the gray values of the pixels contained in that region. In the case of overexposure where the light is seriously scattered, the collimation edges no longer appear as a straight line, but a concave curve. As a result, the collimated region behind the straight collimation edge will include some pixels having a high gray value. As such, the ratio of the pixels with high gray values that constitute the collimated region with respect to the entire pixels in that region should be a very important standard for testing the validity of the candidate collimation edge line.

Therefore, a pixel with a gray value larger than a proportion of the grey value maximum pixel value, for example, 0.8*P_Max, may be defined as a pixel having a high gray value. However, the ratio of the pixels with high gray value to the entire pixels of the collimated region should not exceed a threshold value, which depends on the distance from the candidate collimation edges to the image edges. In particular, the closer the distance is, the greater the threshold value should be. This is because the closer the candidate collimation edges are to the image edges, the smaller the assumed collimated region will be, the greater the number of high pixel points appearing in the collimated region due to overexposure. Consequently, this ratio should be larger.

Figure 8:
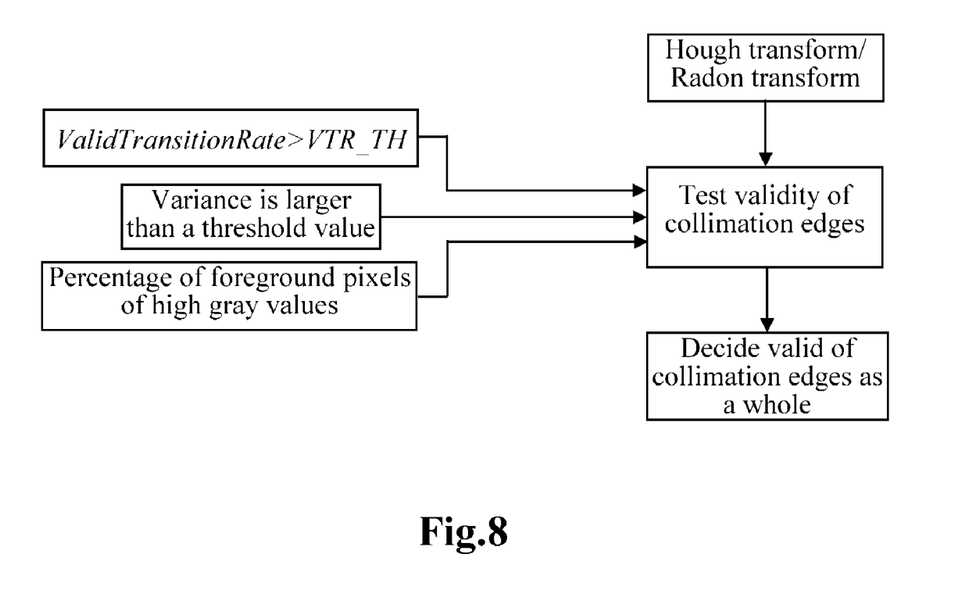
FIG. 8 is a flow diagram of a method for verifying of the validity of the resultant collimation edges.

On the other hand, the closer the candidate collimation edges are to the image edges, the higher the risk of a false positive report, as shown in FIG. 8. Assuming that the relative dimension and position information of the collimation window is known, the collimated region projected on the detector plane is also known. Again, as described in step 109, only one straight line needs to be obtained as the candidate straight collimation edge for this region. Therefore, the second judgment step 113 will be unnecessary.

Figure 9:
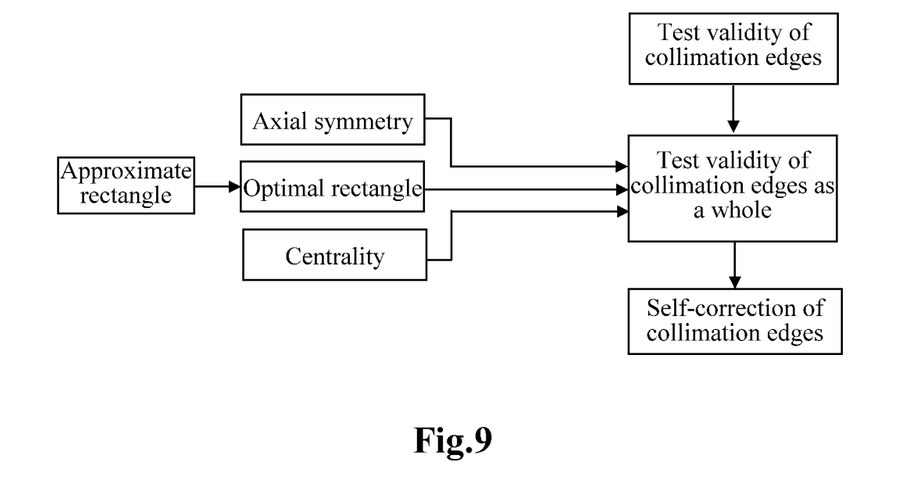
FIG. 9 is a flow diagram of a method for verifying the validity of the resultant collimation edges as a whole.

In the third decision making step 115, a decision is made as to the validity of the resultant candidate straight collimation edges as a whole (or the candidate straight collimation edges which have been proved valid in step 113, if any), in order to retain an ideal set of candidate collimation edges. Generally, when a collimation assembly (X-ray source assembly) cannot rotate separately, the opposing collimation edges should be in axial symmetry with each other with respect to a vertical line or a horizontal line across the image center (the vertical line corresponding to left and right edges, and the horizontal line corresponding to upper and lower edges). The symmetry is not necessarily in the strict geometrical sense, but only approximately symmetric. If the collimation assembly (X-ray source assembly) can rotate separately, the axes should be the vertical line or horizontal line across the image center, which has been properly rotated by a certain angle. According to the axial symmetry principle, the inner angles as formed should be equal, and the distances from various points on the line to the symmetric axis should be equal. Since it is possible that the collimator center and the detector center are not aligned with each other, the axes may need to be translated. The pair of straight edges that most satisfy the axial symmetry is considered as the optimal pair. In addition, if the opposing edges are parallel or generally parallel with each other, the adjacent edges should be perpendicular. Since the closer the candidate collimation edge is to the center, the more possible a false positive will be reported, as described with respect to step 113, and since some limitations are imposed on the parameters, it is reasonable to believe that the collimation edges closer to the center should be given a higher priority, as shown in FIG. 9. It should be noted that if the relative dimension and position information of the collimation window are known, step 115 is no longer unnecessary, as has been reasoned in connection with step 109.

In step 117, some corrections are made to check the presence of any possible failed detection, such as missing detection and wrong detection. So far, as steps 101-115 are finished, an optimal set of candidate collimation edge lines has been obtained. Experimental data show that the so-obtained collimation edges are highly reliable. That is, the detection of the collimated region has been successfully implemented. Experiments show that missing detection may still be possible in some cases because of a totally invisible contrast between the foreground and the tissue at either the upper, lower, left or right area of the image. In addition to missing detection, there will possibly be a wrong detection, owing to the similarity in the intersection between tissues and the intersection between the collimated region and other regions.

Step 117 is designed to address such problems. In one embodiment, step 117 is performed as follows. An examination is made as to whether the collimator center and the detector center are in alignment, and, if not, how much they are offset with each other in either the vertical direction or the horizontal direction. If the right or left collimation edge (or either the upper edge or the lower edge) is already detected, based on the offset amount and axial symmetry principle, its opposing collimation edge may be determined.

The following analysis is then performed upon the determined collimation edge. A position in the collimated region behind the edge line concerned is selected; and all pixels on the same row or column as the selected position have the variance in gray values calculated. Subsequently, as has been discussed in step 107, it is observed whether or not the variation in gray values of the pixels in the collimated region (or at least pixels in the same row or column) is relatively small, and whether the computed variance is smaller than a threshold value, e.g., 0.2*P_Max. The same conditions should be satisfied as in step 107. Generally, the determined collimation edge should be relatively far away from the image edges. That is, the collimation edge obtained from the offset amount should not be extremely close to the image edge, i.e., a buffer area should exist therebetween, because it is likely that the edge is exactly the intersecting lines between the collimated region and other regions.

On the contrary, if the straight collimation edges obtained based on the offset amount do not satisfy the above requirements, the determined straight collimation edges should be excluded as a false positive (i.e., wrong detection). If the collimation edge in each of the four edge regions of the image is determined, an examination is made to whether the opposing edges satisfy the axial symmetry based on the offset amount. They do not have to strictly satisfy the axial symmetry requirements, because the opposing collimation edges as determined will be less similar with each other due to transition factors. A variance analysis is necessary for each edge. The offset amount may be obtained through periodic corrections in the following steps: opening the collimator (ensuring that up, down, left and right portions should include the collimated region) to make sure that there is nothing existing in the X-ray radiation range between the collimator and the detector; directly exposing with a low dosage to obtain an image with good contrast between the foreground and the background (the image should have only the foreground region and the background region); segmenting the image using the techniques described hereinabove; and, if it is determined that the segmentation is perfectly done, recording the offsets of the upper and lower edges and the left and right edges relative to the image center; exposing the collimation windows of different sizes for multiple times; and finally obtaining an average offset amount. In this manner, the relative offset amount between the collimator center and the detector center is obtained.

Figure 10:
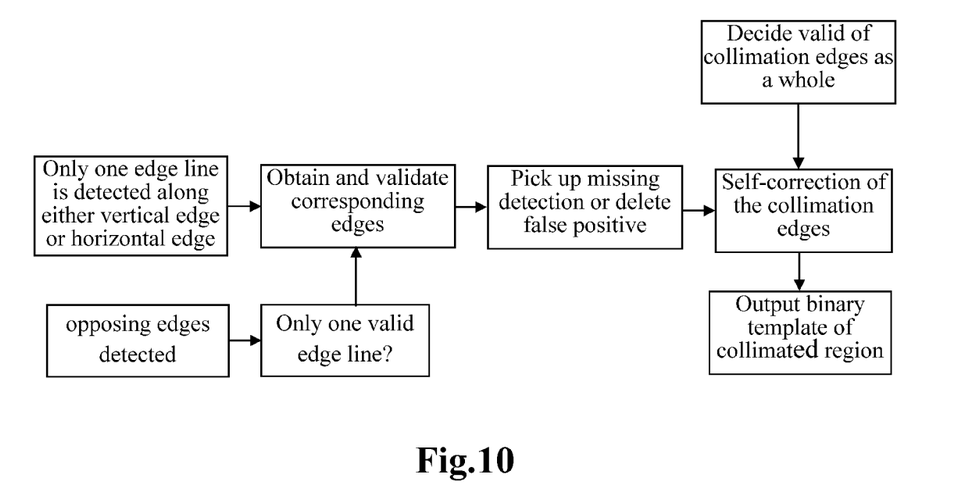
FIG. 10 is a flow diagram of a method for automatically correcting collimation edges.

Another method for determining the offset amount may be performed as follows. First, it is determined whether the determined candidate collimation edges form a perfect rectangle. If so, distance from each of the collimation edges to the image center is computed to obtain the offset amount. Assuming the offset obtained at the nth time is Offset_n, and the previous offset is Offset_old, then the new offset is Offset_new=[Offset_old*(n−1)+Offset_n]/n. When n is larger than a predetermined number N (e.g., 200), Offset_new=Offset_n, and the current n is recorded as 1. n and Offset_old are respectively written into one file. A simple read from or write to the file may access or update the Offset value. The requirement as to n<N is intended to periodically update Offset, so as to ensure the Offset to be updated along with correction or change of any mechanical position, as shown in FIG. 10. It should be noted that if the relative dimension and position information of the collimation window are known, step 117 is unnecessary, as has been reasoned in connection with step 109.

In the output step 119, the image is divided into a collimated region and a non-collimated region, the former being set to 1 or 0, while the latter being set to 0 or 1. Finally, a binary image is outputted.

Figure 11:
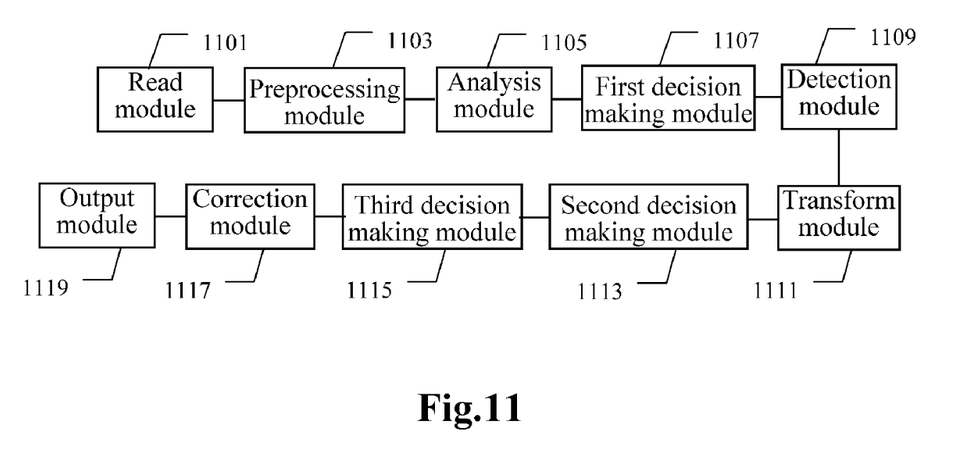
FIG. 11 is a structural block diagram of an apparatus for automatically detecting collimation edges.

As shown in FIG. 11, an apparatus for automatically detecting the collimation edge may include a read module 1101, a detection module 1109, a transform module 1111, and optionally other modules. The read module 1101 is used to read an image captured by an X-ray imaging system for subsequent detection and analysis. The detection module 1109 is used to detect intersections between the foreground, the background and the tissue. The detection module 1109 is configured to perform a slide mean value filtering upon pixels of each row and each column in the image so as to generate a row-filtered image and a column-filtered image; and then to detect the intersecting point row by row from left to right and vice versa for the row-filtered image, and detect the intersecting point column by column from top to bottom and vice versa for the column-filtered image. The transform module 1111 is used to transform the detected intersection points into straight lines as the candidate collimation edges based on an HT or RT transform. The detection module 1109 and the transform module 1111 divide the image into upper, lower, left, and right regions for the subsequent detection and HT/RT transform. The transform module 1111 limits the angle variation in the vertical direction to $\theta \in [-20,20]$ while in the horizontal direction to $\theta \in \{[70,90] \cup [-90,-70]\}$.

The input image read by the read module 1101 may be a raw image, or may be preprocessed by a preprocessing module 1103. For example, the image may be shrunk and properly cropped. The image is shrunk to speed up the calculation, while properly cropped to exclude any unnecessary detection. The analysis module 1105 is used to perform a histogram analysis and/or cumulative histogram analysis on the X-ray image, so as to obtain maximum and minimum pixel gray values on the image for use in the subsequent detection. The first decision making module 1107 is used to calculate a mean gray value and/or variance with respect to an entire row or entire column of pixels at the edges of the image. If the mean gray value and/or the variance are/is smaller than a predetermined threshold value, it is determined a collimated region is present on the image. As to each of the determined straight collimation edges, the second decision making module 1113 calculates the ratio of the number of the intersection points falling into the intersecting region to the number of the intersection points falling into the foreground region. If the ratio is larger than a predetermined threshold value, the resultant collimation edge is considered valid.

If multiple straight collimation edges are obtained or multiple sets of valid edges are determined by the second judgment module, a third decision making module 1115 determines candidate edges that best satisfy the axial symmetry principle as the true collimation edges. A correction module 1117 is used to check the presence of any possible failed detection (such as missing detection and wrong detection); pick up the missing edges based on the axial symmetry principle and the offset amount between the collimator center and the detector center; and obtain the offset amount of the current edge from the image center based on the opposing edges as determined. If the difference between this offset and the known possible offset is significant, the variance in gray values of the pixels in the same row or column at a position behind the determined collimation edge is calculated. If the variance is larger than a predetermined threshold value, the edge as obtained is considered as wrong and is thus excluded. In addition, the correction module 1117 is also capable of picking up the missing collimation edges using the axial symmetry principle and the offset amount between the collimator center and the detector center. An output module 1119 sets the collimated region to 1 or 0, sets the non-collimated region to 0 or 1, and outputs a binary image.

Although the invention has been described with reference to specific embodiments, it is not intended that the invention be limited to those specific embodiments. Those skilled in the art should understand that they can make various modifications, substitutions, and alterations to, for example, the order of executing the steps or connecting the functional modules, without departing from the spirit of the present disclosure. These various modifications, substitutions, and alterations should fall within the protection scope of the invention. In addition, as used herein, some terms, such as "left", "right", "up" or "upper", "down" or "lower" in this specification and claims are to be considered as illustrative only, but not restrictive.

What is claimed is:

1. A method of automatically detecting a collimation edge, comprising:
   reading an image captured by an X-ray imaging system;
   detecting intersection points between a foreground and a background and between a foreground and a tissue on the X-ray image, wherein detecting the intersection points comprises detecting the intersection points row by row from left to right and then from right to left for the image, and detecting the intersection points column by column from top to bottom and then from bottom to top for the image; and
   performing a Hough transform or Radon transform on the detected intersection points to obtain collimation edge lines between the foreground and the background, and the foreground and the tissue, respectively.

2. The method according to claim 1, further comprising:
   performing a histogram analysis and/or a cumulative histogram analysis upon the X-ray image, so as to obtain valid maximum and minimum gray values of pixels on the image.

3. The method according to claim 1, further comprising:
   shrinking and/or cropping the read image.

4. The method according to claim 2, further comprising:
   calculating a mean gray value and/or variance in the gray value of an entire row or entire column of pixels in an edge region of the image before detecting the image; and, if the mean gray value and the variance are smaller than respective predetermined threshold values, initially determining that a collimated region is present on the edge region of the image to be detected.

5. The method according to claim 1, further comprising:
   considering each of the determined straight lines representing the collimation edges as valid so as to determine intersecting area between regions and the foreground region;
   calculating a ratio of the number of intersection points falling in the intersecting area to the number of intersection points falling in the foreground region, and
   determining the collimation edge lines as valid, if the ratio is greater than a predetermined threshold value.

6. The method according to claim 5, wherein the predetermined threshold value increases as the distance from the collimation edge line to the image center decreases; and the predetermined threshold value are segmented values within a predetermined range or may be a linear decreasing function vs. the distance; and wherein the predetermined threshold value ranges from 0.5 to 1.5.

7. The method according to claim 1, further comprising:
   among the collimation edge lines as obtained, or sets of collimation edge lines that have been proved valid, determining those that most satisfies an axial symmetry condition as the collimation edges.

8. The method according to claim 1, further comprising:
   determining an offset from a collimation edge to the image center based on position data on the opposing edge of said collimation edge;
   if the offset deviates from a known possible offset, calculating gray value variance of a row or column of pixels in the collimated region at a position behind that collimation edge line; and if the variance is greater than a predetermined threshold value, determining the collimation edge line concerned as a wrong straight line and excluding the wrong straight line.

9. The method according to claim 8, wherein determining an offset from the determined collimation edge to the image center comprises:

determining collimation edges from an X-ray image captured when there is nothing existing between the collimator and the detector; and calculating the distance from the collimation edges to the image center as the offset amount.

10. The method of claim 8, wherein determining an offset from the determined collimation edge to the image center comprises determining, as the offset amount, the distance from opposing edges among the determined collimation edges that form the best rectangle to the image center.

11. The method according to claim 4, wherein both the predetermined threshold value of the mean gray value and the predetermined threshold value of the variance are a percentage of the valid maximum gray value.

12. The method according to claim 1, further comprising:

setting the collimated region of the image to 1 or 0, while setting the non-collimated region to 0 or 1; and outputting a binary image.

13. The method according to claim 1, wherein detecting intersection points further comprises:

filtering pixels of each row and each column in the image so as to generate a row-filtered image and a column-filtered image; and detecting the row-filtered image row by row, while the column-filtered image column by column.

14. The method according to claim 1, wherein detecting intersection points further comprises:

determining an intersecting area according to the principle that the gray value begins increasing at the starting pixel and the gray value remains unchanged at the end pixel, based on the difference between the value of the end pixel and the value of the starting pixel, and the distance between the end pixel and the starting pixel; and selecting, as the transition point, the point at which the gray value changes the most rapidly, or the middle point, the starting point, or the end point of the intersecting area, or the middle point of a predetermined length of pixels where the gray value varies the most rapidly.

15. The method according to claim 1, wherein, for each row or each column, only one intersecting point is selected out of the intersection points between the foreground and the background, and out of the intersection points between the foreground and the tissue can be determined, the detection of the intersecting point between the foreground and the background being independent from the detection of the intersecting point between the foreground and the tissue.

16. The method according to claim 1, wherein the image is divided into a upper region, a lower region, a left region, and a right region for detection and transform processing; and wherein variation in an angle $\Theta$ involved in the transform step is limited to $\theta \in [-20,20]$ along a vertical edge, while limited to $\theta \in \{[70,90] \cup [-90,-70]\}$ along a horizontal edge.

17. The method according to claim 1, wherein, when the transform is performed, the number of local peaks that satisfy the threshold conditions is limited.

18. An apparatus for automatically detecting a collimation edge, comprising:

a read module for reading an image captured by an X-ray imaging system;

a detection module for detecting intersection points between a foreground and a background and between a foreground and a tissue on the X-ray image, the detection module being configured to detect the intersection points by detecting the intersection points row by row from left to right and then from right to left for the image, and detecting the intersection points column by column from top to bottom and then from bottom to top for the image; and a transform module performing a Hough transform or Radon transform on the detected intersection points to form collimation edge lines interconnecting the foreground and the background, and the foreground and the tissue, respectively.

19. The apparatus according to claim 18, further comprising:

an analysis module for performing a histogram analysis and/or a cumulative histogram analysis upon the X-ray image, so as to obtain valid maximum and minimum gray values of pixels on the image.

20. The apparatus according to claim 18, further comprising:

a preprocessing module for shrinking and/or cropping the read image.

21. The apparatus according to claim 18, further comprising:

a first decision making module for calculating a mean gray value and/or variance in the gray value of an entire row or entire column of pixels in an edge region of the image before detecting the image; and, if the mean gray value and the variance is smaller than a respective predetermined threshold value, initially determining that a collimated region is present on the edge region of the image to be detected.

22. The apparatus according to claim 18, further comprising:

a second decision making module for considering each of the determined collimation edge lines as valid so as to determine intersecting area between regions and the foreground region, calculating a ratio of the number of intersection points falling in the intersecting area to the number of intersection points falling in the foreground region, and determining the collimation edge lines as valid, if the ratio is greater than a predetermined threshold value.

23. The apparatus according to claim 18, further comprising:

a third judgment module for determining a collimation edge line, among the collimation edge lines as obtained, or among sets of collimation edge lines that have been proved valid, which most satisfies an axial symmetry condition as the collimation edge.

24. The apparatus according to claim 18, further comprising:

a correction module, adapted for correcting any failed detection in the following steps:

determining an offset from a collimation edge to the image center based on position data on the opposing edge of said collimation edge; if the offset deviates from a known possible offset, calculating a gray value variance of a row or column of pixels in the determined collimated region at the position behind the collimation edge line concerned; and, if the variance is greater than a predetermined threshold value, determining the collimation edge line concerned as a wrong straight line and excluding the wrong straight line; or picking up a missing collimation edge line based on the axial symmetry condition and the offset between the collimator center and the detector center.

25. The apparatus according to claim 18, further comprising:
an output module for outputting a binary image, wherein the collimated region is set to 1 or 0, while non-collimated region is set to 0 or 1.

26. A device for automatically detecting a collimation edge, comprising:

means for reading an image captured by an X-ray imaging system;

means for detecting intersection points between a foreground and a background and between a foreground and a tissue on the X-ray image by detecting the intersection points row by row from left to right and then from right to left for the imagine, and detecting the intersection points column by column from top to bottom and then bottom to top for the image; and means for performing a Hough transform or Radon transform on the detected intersection points to obtain collimation edge lines between the foreground and the background, and the foreground and the tissue, respectively.

* * * * *